(12) United States Patent
Simpson et al.

(10) Patent No.: US 7,420,704 B2
(45) Date of Patent: Sep. 2, 2008

(54) SYSTEM AND METHOD FOR COLOR GAMUT INADEQUACY NOTIFICATION

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.L.P., Houston, TX (US)

( * ) Notice: Subject to any disclaimer, the term of this patent is extended or adjusted under 35 U.S.C. 154(b) by 1087 days.

(21) Appl. No.: 10/039,105

(22) Filed: Jan. 4, 2002

(65) Prior Publication Data

US 2003/0128376 A1 Jul. 10, 2003

(51) Int. Cl.
*G06F 15/00* (2006.01)
*G06K 1/00* (2006.01)

(52) U.S. Cl. .............. 358/1.9; 358/2.1; 358/405; 358/524; 358/527; 382/167

(58) Field of Classification Search .............. 358/1.9, 358/2.1, 405, 524, 527, 1.12; 382/167
See application file for complete search history.

(56) References Cited

U.S. PATENT DOCUMENTS

| | | | |
|---|---|---|---|
| 4,500,919 A | | 2/1985 | Schreiber |
| 5,740,076 A | * | 4/1998 | Lindbloom .............. 345/590 |
| 5,815,642 A | * | 9/1998 | Kumada .................. 358/1.9 |
| 6,377,355 B1 | * | 4/2002 | Kumada ................. 358/1.12 |
| 6,421,141 B2 | * | 7/2002 | Nishikawa .............. 358/1.9 |
| 6,563,944 B1 | * | 5/2003 | Kumada .................. 382/162 |
| 2001/0038468 A1 | | 11/2001 | Hiramatsu |
| 2002/0163570 A1 | * | 11/2002 | Phillips .................. 347/224 |
| 2003/0156299 A1 | * | 8/2003 | Martinez et al. ......... 358/1.9 |
| 2004/0207862 A1 | * | 10/2004 | Such et al. .............. 358/1.9 |

FOREIGN PATENT DOCUMENTS

| | | |
|---|---|---|
| DE | 19844495 | 4/2000 |
| DE | 10017831 | 10/2001 |
| EP | 0665677 | 8/1995 |
| EP | 0665682 | 9/2001 |

* cited by examiner

*Primary Examiner*—Twyler L. Haskins
*Assistant Examiner*—Michael Burleson

(57) ABSTRACT

The present disclosure relates to a system and method for color gamut inadequacy notification. In one arrangement, the system and method pertain to accessing imaging data to be printed, identifying colors represented by the imaging data, comparing the identified colors with a color gamut of a printing device, and notifying the user if one or more of the identified colors is not included in the color gamut of the printing device.

32 Claims, 10 Drawing Sheets

SYSTEM AND METHOD FOR COLOR GAMUT INADEQUACY NOTIFICATION

FIELD OF THE INVENTION

The present disclosure relates to a system and method for color gamut inadequacy notification. More particularly, the disclosure relates to a web-based imaging system and method with which users can be warned as to the inadequacy of the color gamut of a printing device prior to printing.

BACKGROUND OF THE INVENTION

As computer technology has advanced, the role of computers in our daily lives has expanded, as has the need for various peripheral or supporting devices. One typical peripheral device used with computers is a printer, which generates hard copies of electronic data. The types and capabilities of available printers have similarly been expanding, resulting in a wide variety of printers with a range of printing capabilities, performance, and price.

One significant expansion in the use of computer technology is the networking of computers. Networking computers together allows the computers to communicate with one another as well as with other devices, such as printers. As computer networks, such as the Internet, continue to develop, there is increasing demand for additional and improved functionalities that draw upon and exploit the full computing potential of computer networks.

With the availability of computer networks, these networks can now be used for printing. For instance, users may be able to access the facilities of remote printing services via a network such as the Internet. Such an arrangement can, however, create unexpected results. For example, the user may not be aware of the capabilities of the printing device that will be used to print the document or documents. In such a case, it is possible that the color gamut of the printing device used to print the documents will not include one or more specific colors (e.g., Pantones™) contained in the document. Therefore, the user may be unsatisfied with the printing result. Clearly, this can be a significant problem, especially where a large number of documents are to be printed and the colors in the documents are important (e.g., in the case of a company logo).

SUMMARY OF THE INVENTION

The present disclosure relates to a system and method for color gamut inadequacy notification. In one arrangement, the system and method pertain to accessing imaging data to be printed, identifying colors represented by the imaging data, comparing the identified colors with a color gamut of a printing device, and notifying the user if one or more of the identified colors is not included in the color gamut of the printing device.

The present disclosure also relates to a network-based service that is configured to notify a user as to an inadequate color gamut condition. In one arrangement, the service comprises logic configured to access imaging data to be printed, logic configured to identify colors represented by the imaging data, logic configured to compare the identified colors with a color gamut of a printing device, and logic configured to notify the user if one or more of the identified colors is not included in the color gamut of the printing device.

Moreover, the present disclosure relates to a printing device. In one arrangement, the printing device comprises a processing device, and memory including logic configured to access imaging data to be printed, logic configured to identify colors represented by the imaging data, logic configured to compare the identified colors with a color gamut of a printing device, and logic configured to notify the user if one or more of the identified colors is not included in the color gamut of the printing device.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for notifying a user as to the inadequacy of the color gamut of a printing device prior to printing. In some arrangements, the system has a distributed architecture with which a user can maintain imaging data to be added to a printed document. In a such a scenario, the user accesses a network-based or web-based imaging service that enables the user to access the imaging data in the user's personal imaging repository, as well as arrange the imaging data as desired. Once the arrangement has been selected, a document can be stored in the user's personal imaging repository and, if desired, one or more hard copy documents can be generated using a network-based or web-based printing service.

To facilitate description of the inventive system and method, example systems are discussed with reference to the figures. Although these systems are described in detail, it will be appreciated that they are provided for purposes of illustration only and that various modifications are feasible without departing from the inventive concept. After the description of the example systems, examples of operation of the systems are provided to explain the manners in which users can be notified as to an inadequate color gamut.

Figure 1:
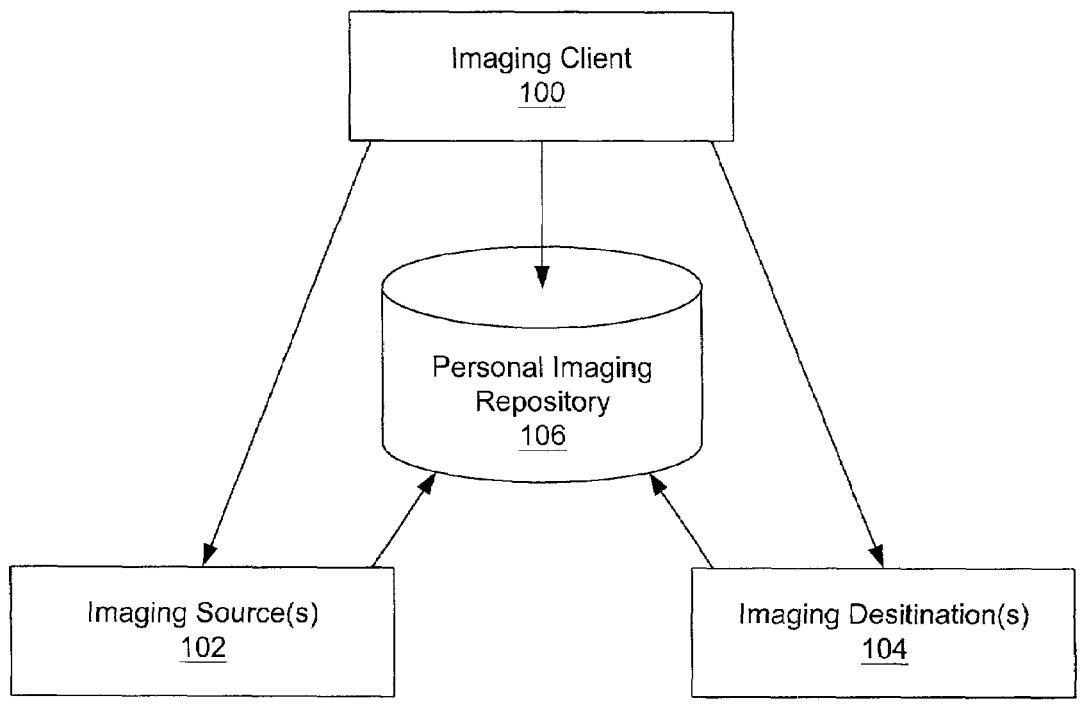
FIG. 1 is a schematic representation of the general operation of the invention.

FIG. 1 is a schematic representation of the general operation of the invention. As shown in this figure, an imaging client 100 communicates with one or more imaging sources 102, one or more imaging destinations 104, and a personal imaging repository 106. The imaging source(s) 102 represent any of a wide variety of devices/services that can be accessed by the imaging client 100 and used to select or identify imaging data to be used to create a document.

The personal imaging repository 106 provides image storage facilities that typically are personalized for the individual imaging client 100. The imaging repository 106 can be located in various different places. For example, the repository 106 can be maintained on one or more computing devices associated with the imaging client 100, imaging source(s) 102, or imaging destination(s) 104. Alternatively, the repository 106 can be maintained on a separate computing device (e.g., server) that the imaging client 100, imaging source(s) 102, and imaging destination(s) 104 can access. The imaging data in the imaging repository 106 can be any type of printable data, such as text, graphics, frames of video or animations, pictures, combinations thereof, and so forth.

Once imaging data are stored in the personal imaging repository 106, the imaging client 100 can select data from the repository that are to be communicated to the imaging destination(s) 104 for some form of processing or manipulation. By way of example, the data are communicated to the image destination(s) 104 for printing. Where the imaging destination(s) 104 are adapted for printing, they may comprise any of a wide variety of printing devices that are capable of generating hard copy documents, such as printers, multifunction peripherals (MFPs), plotters, services managing printing devices, and so on.

As will be apparent from the discussions that follow, the above-described manner of operation provides a high degree of personalization to the imaging client 100. Specifically, in that the client's personal information can be accessed and utilized with any participating service (e.g., web site) used by the client, each service can be customized for the user.

Figure 2:
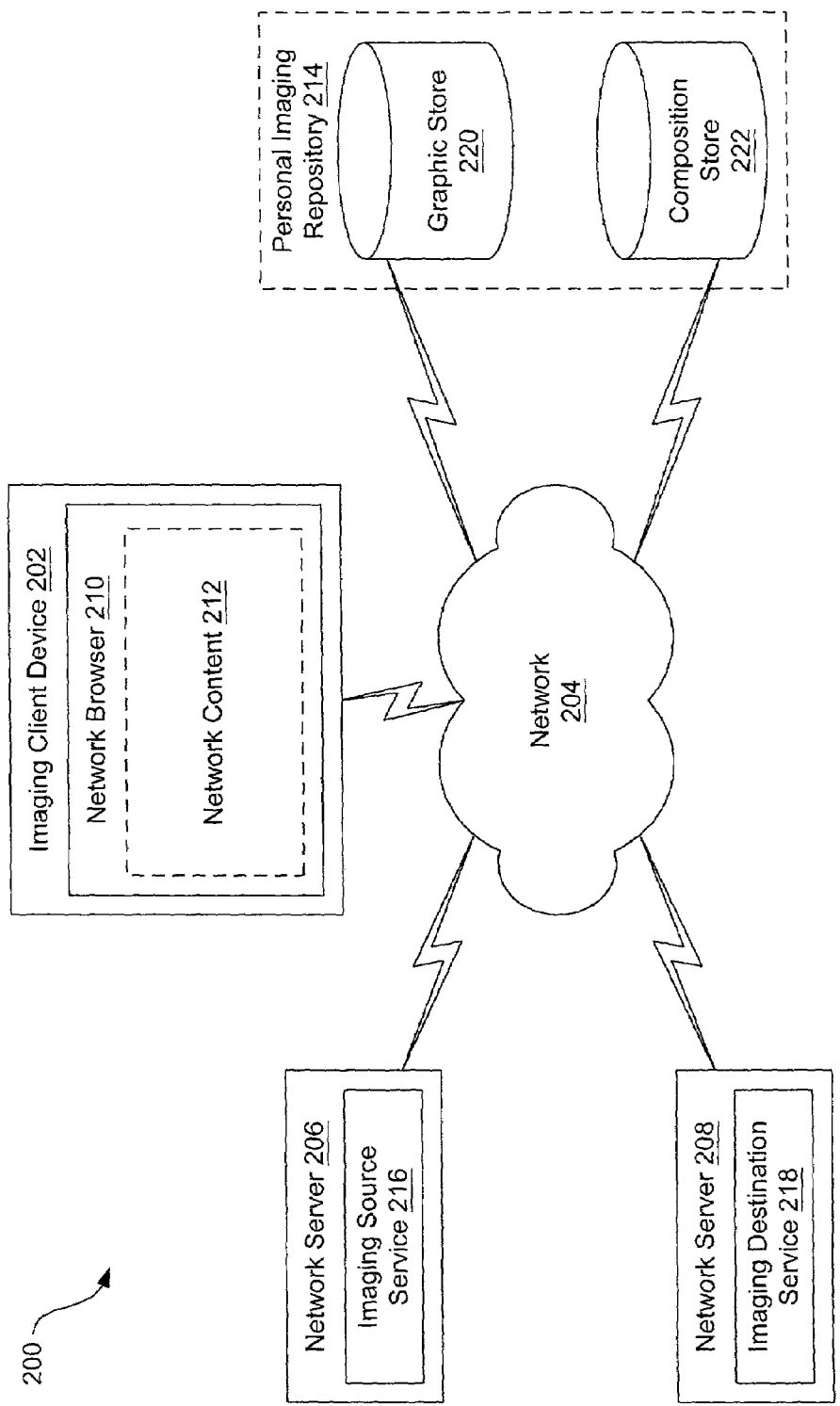
FIG. 2 is an example distributed system in which the invention can be implemented.

FIG. 2 illustrates an example distributed system 200 in which the invention can be implemented. As indicated in FIG. 2, the system 200 includes an imaging client device 202 that is coupled to a network 204. Through this coupling, the imaging client device 202, and therefore the imaging client (i.e., user), can be placed in communication with one or more network servers, such as servers 206 and 208. The client device 202 and network servers 206 and 208 represent any of a wide variety of conventional wired and/or wireless computing devices, such as desktop computers, portable computers, dedicated server computers, multi-processor computing devices, personal digital assistants (PDAs), mobile telephones, pen-based computers, gaming consoles, and so forth.

The network 204 represents one or more data distribution networks that can be used to communicate data and other information (e.g., control information) between or among various computing devices. Examples for the network 204 include the Internet, a local area network (LAN), a public or private wide area network (WAN), and combinations thereof. The network 204 can further include various different types of networks, including wired and/or wireless portions, employing any of a wide variety of different communications protocols including public and/or proprietary communications protocols.

During operation, the user can operate a network browser 210 executing on the imaging client device 202 to interact with imaging services 216, 218 executing on the network servers 206 and 208. As used herein, the term "services" refers to software and/or firmware components that can execute on one or more computing devices and which provide one or more particular functionalities to the imaging client device 202 such as imaging data selection and arrangement, data manipulation, printing, and so forth. As indicated in FIG. 2, the network browser 210 can receive network content 212 from one or more of the network servers 206 and 208. This content 212 typically includes various components such as, for example, text, graphics, and various commands (e.g., hypertext mark-up language (HTML), Java™, JavaScript™, etc.) and/or applications (e.g., Java™ applets). In use, the content 212 can, in some arrangements, facilitate communication with a personal imaging repository 214 so that the servers 206 and 208 can access data stored in the repository. Examples of the ways in which this communication can be facilitated are described below with reference to FIGS. 3 and 4.

The network server 206 executes an imaging source service 216 that, among other things, allows the user to interact with his or her personal imaging repository 214. The imaging source service 216 may actually provide multiple services that can be accessed. In some embodiments, these different services can provide different functionalities. For instance, one service may be responsible for graphic storage and retrieval while another service may be responsible for merging graphics in a single document. By accessing these services with the network browser 210, the user can select or identify imaging data that are to be stored as graphics in a graphic store 220 of the personal imaging repository 214. These graphics can be stored as individual files and generally can comprise any data capable of being represented as a two dimensional graphic. As is discussed below, the individual graphics in store 220 can be used as individual images that can be printed on appropriate print media, or multiple individual graphics can be compiled together as a single image for printing.

Irrespective of whether multiple graphics are to be used, the imaging source service 216 can be used to arrange the graphic(s) on a visual representation of a document to be created. Once the arrangement has been selected, the imaging source service 216 can store the arrangement as a composition (i.e., a composition image) in a composition store 222 of the personal image repository 214. It is to be noted that, although the graphic store 220 and the composition store 222 are illustrated as two separate stores, multiple such stores may exist in the system 200 and one or more graphic stores may be combined with one or more composition stores. Additionally, one or more of these stores 220 and 222 may be implemented on the imaging client device 202, one or more of the servers 206 or 208, or another designated computing device (not shown).

Once the graphics and composition have been selected, the image data can be processed or otherwise manipulated by accessing an imaging destination service 218 that executes on the network server 208. Where one or more hard copy documents are to be generated, this service 218 can comprise a print service with which the document(s) can be printed. The print service may be closely associated with the printing device used to generate the document(s) and can, for example, be hosted by the printing device itself. In such a case, the server 208 may comprise an embedded server of the printing device. Irrespective of how the service is hosted, a print request is communicated to the imaging destination service 218 and, upon receipt of the print request, the network server 208 interacts with the graphic store 220 and composition store 222 to retrieve the data needed to complete the print job. Once these data are retrieved, the network server 208 interacts with one or more printing devices (not shown) to which the server is coupled (directly or indirectly) to generate the hard copy document(s).

Figure 3:
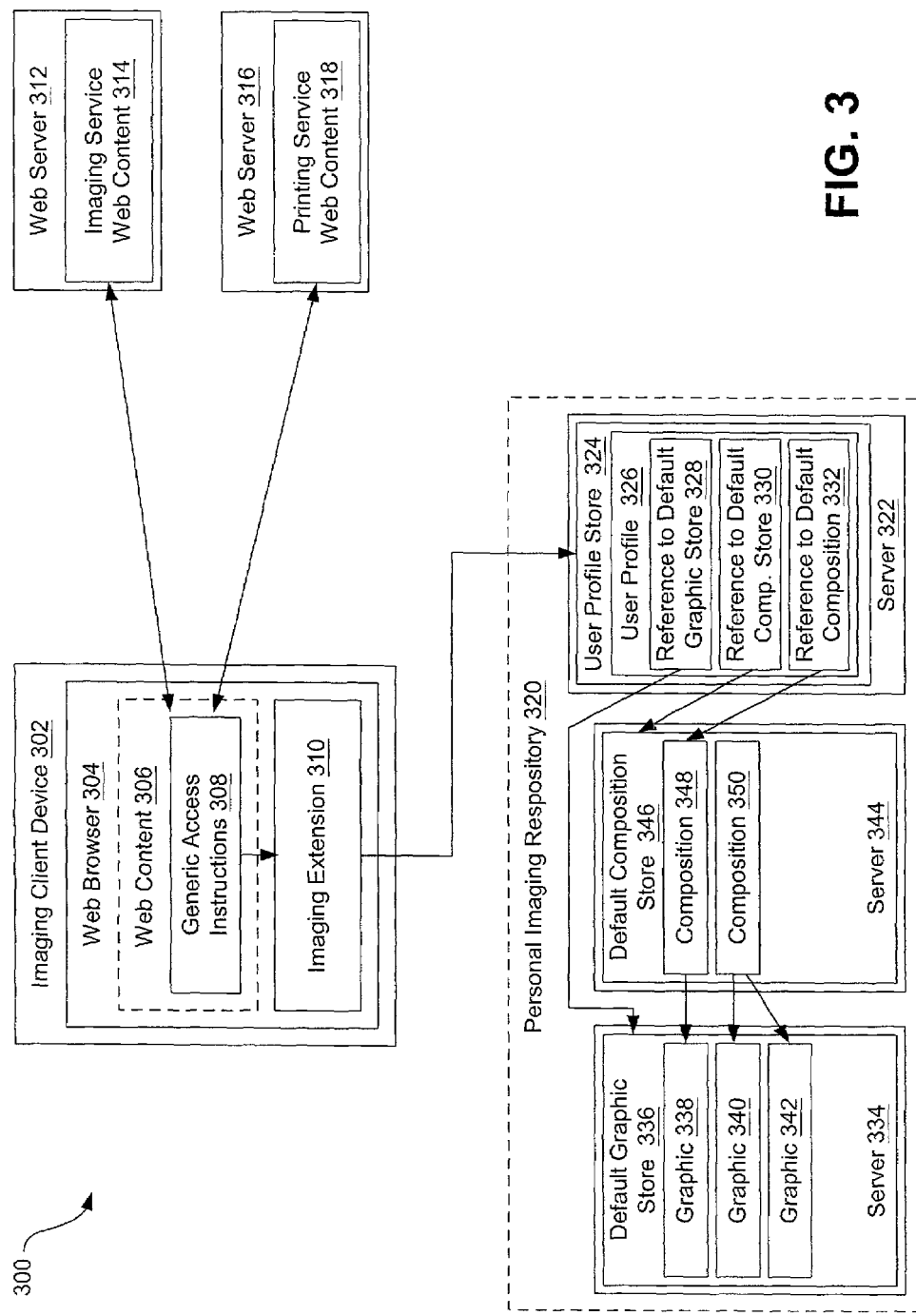
FIG. 3 is a first example web-based imaging system in which the invention can be implemented.

FIG. 3 illustrates a first example web-based imaging system 300 in which the invention can be implemented. As will be appreciated from the discussion that follows, this system 300 can be described as a client-based implementation in that much of the system functionality is provided by a client device. A similar system is described in detail in U.S. patent application Ser. No. 09/924,058, entitled "A Method, System and Program Product for Multiprofile Operations and Expansive Profile Operation," by Shell Simpson, Ward Foster, and Kris Livingston and bearing the disclosure of which is hereby incorporated by reference into the present disclosure.

As indicated in FIG. 3, the system 300 includes an imaging client device 302. The imaging client device 302 comprises a web browser 304 that is adapted to access web content 306 derived from imaging service web content 314 and printing service web content 318 of web servers 312 and 316, respectively. The web content 306, like content 212, typically comprises text, graphics, and various commands. The commands can comprise one or more sets of executable instructions that are downloaded into the browser 304 to perform a service requested by the user. These instructions can be written in any suitable language including, for instance, HTML, Java™, JavaScript™, C-sharp, or other appropriate language. A variety of different functionalities can be served by the executable instructions. For example, the web content 306 normally includes executable instructions for causing target graphics, i.e. graphics provided by an accessed web site, to be displayed to the user.

In the embodiment shown in FIG. 3, the executable instructions are further used to access a personal imaging repository 320. These instructions typically comprise system-wide generic access instructions 308 that call on methods of an imaging extension 310 to access the personal imaging repository 320 and perform various web imaging operations. These instructions 308 are designated as "generic" because they are independent of the configuration of the user's personal imaging repository 320. As is discussed in greater detail below, the generic access instructions 308 can be used to, for example, add a graphic to a default graphic store 336 of the personal imaging repository 320, or add a new composition to a default composition store 346 of the repository.

As is further indicated in FIG. 3, the imaging extension 310 can form part of the browser 304. Although this arrangement is shown in the figure and described herein, the imaging extension 310 can, alternatively, be provided outside of the browser 304, for instance on a different device. Irrespective of its location, however, the imaging extension 310 is configured to respond to the execution of the generic access instructions 308 by generating/mapping to corresponding imaging client specific commands of the user. The imaging extension 310 typically is implemented as one or more application programming instructions (APIs) that, preferably, act as interfaces in accordance with a system-wide standard.

When executed, the generic access instructions 308 cause imaging extension calls (e.g., API calls) to be issued which, in turn, cause the imaging extension 310 (e.g., APIs) to access to the user's personal imaging repository 320. The web content 306 therefore uses the imaging extension 310 as a gateway to access the user's personal imaging repository 320. Generally speaking, the APIs can comprise sets of methods for establishing a destination for redirecting the browser 304 based on some form of received redirection initiation. In such circumstances, the process normally comprises receiving a redirection initiation to redirect the browser 304, retrieving a direct or indirect reference to a destination, and then causing the browser to browse to that destination. It will be recognized that there are many other ways (both in hardware and software) to implement this same functionality.

In some arrangements, the imaging extension 310 is configured to prevent the web content 306 (i.e., the executable instructions from one or more web services), from arbitrarily accessing the user's personal imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal imaging repository 320, the web content 306 must first obtain references using the imaging extension API.

The imaging extension 310 can be used to access one or more user profiles 326 that is/are stored in a user profile store 324 of a server 322 of the personal imaging repository 320. By way of example, the imaging extension 310 can be directed to the user profile 326 with a uniform resource locator (URL), pointer, socket, or other backroom detail. In some embodiments, the same user can have multiple user profiles. This may be particularly advantageous when a firewall (not shown) is used in that different graphic stores and composition stores can be used depending on whether the user is inside or outside of the firewall.

The user profile 326 typically includes references to all or a portion of the personal imaging repository 320 for that user profile. For instance, as shown in FIG. 3, the user profile 326 can include a reference 328 to a default graphic store, a reference 330 to a default composition store, and a reference 332 to a default composition. In use, the user profile 326 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default graphic store 336 and the default composition store 346.

Like the user profile store 324, the default graphic store 336 and default composition store 346 can reside on separate servers 334 and 344. It will be understood, however, that one or more of the stores could reside on a single machine, if desired. As indicated in FIG. 3, the default graphic store 336 is used to store various graphics, such as graphics 338, 340 and 342. These graphics can be stored in substantially any format. For example, these formats can comprise PDF, JPEG, PostScript, TIFF, GIF, BMP, etc. In addition, the default graphic store 336 can include one or more APIs. Therefore, in contrast to merely providing for graphic storage, the graphic store 336 can also provide services used to create, retrieve, and/or manipulate graphics. Furthermore, the default graphic store 336 can communicate with the web content of various web services. For example, printing service web content 318 can submit queries to the default graphic store 336 (via the extension 310) about a print job as well as request that one or more graphics be transmitted in a desired arrangement to optimize printing performance.

The default composition store 346 stores various compositions, such as compositions 348 and 350, which can be used to arrange the selected graphics. Like the user profile store 324 and default graphic store 336, the default composition store 346 can also comprise various APIs that can access graphics from the graphic store, manipulate the graphics, etc.

Figure 4:
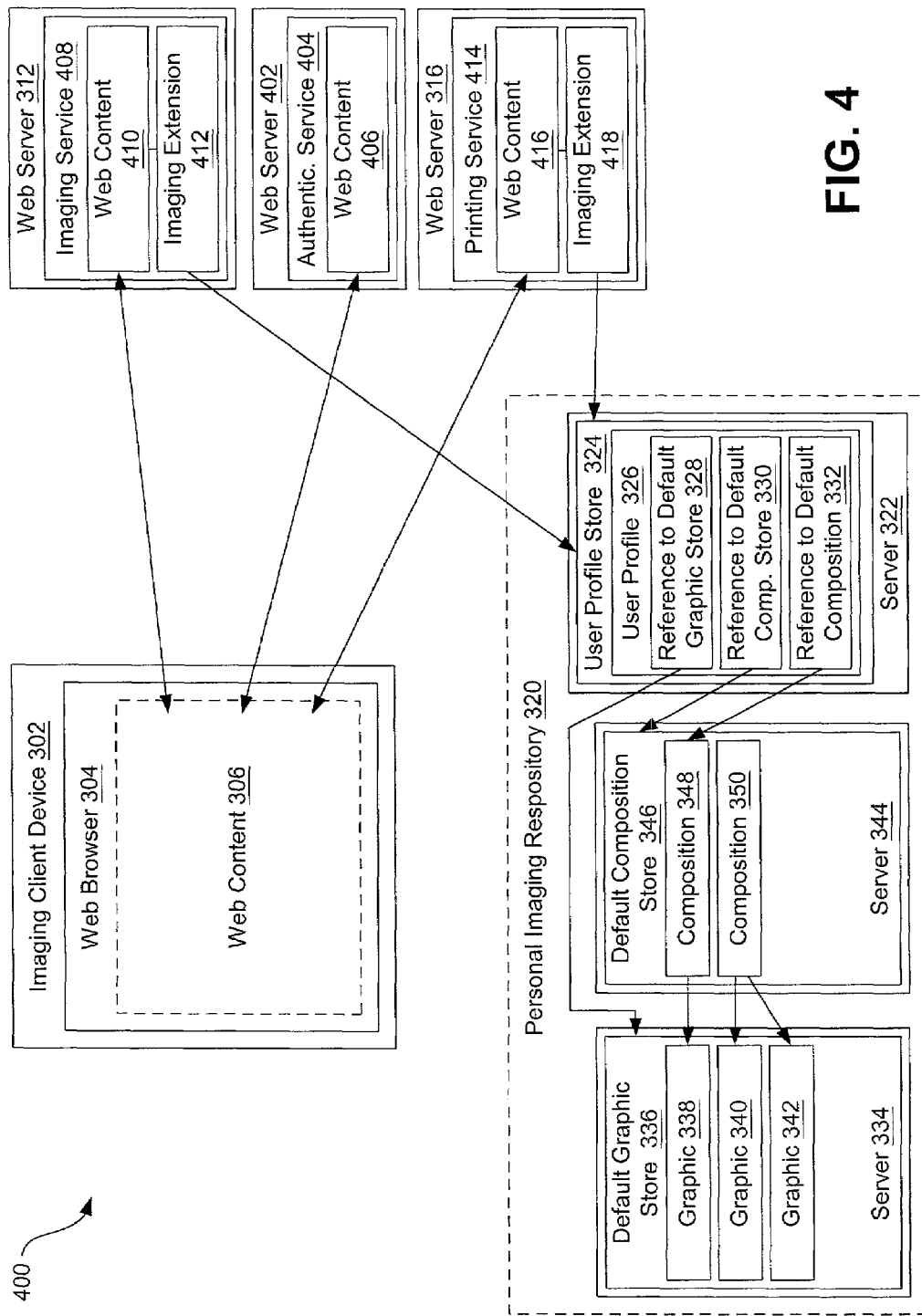
FIG. 4 is a second example web-based imaging system in which the invention can be implemented.

FIG. 4 illustrates a second example web-based imaging system 400 in which the invention can be implemented. As indicated in FIG. 4, the system 400 includes many of the features of the system 300 shown in FIG. 3. Therefore, the system 400 includes an imaging client device 302 that executes a web browser 304 to receive web content 306. The system 400 also includes a personal imaging repository 320 that can, for instance, comprise a user profile store 324, a default graphic store 336, and a default composition store 346. Furthermore, the system 400 includes web servers 312 and 316. Each of these components is generally configured in similar manner as the like-named and numbered features identified in FIG. 3. However, unlike the client-based system 300, the system 400 provides a server-based implementation in which much of the functionality provided by the client device 302 in the system 300 is transferred to another device. By way of example, this other device can comprise a further web server 402, which executes an authentication service 404. As shown in FIG. 4, the authentication service 404 comprises web content 406 (e.g., generated on the fly) that can be downloaded into the user's browser 304.

In addition to the above-noted differences, the servers 312 and 316 are provided with different software in the system 400 to permit alternative modes of operation. By way of example, the web server 312 can execute an imaging service 408, which includes web content 410 and an imaging extension 412. Similarly, the web server 316 can execute a printing service 414 that includes web content 416 and an imaging extension 418. Like the web content 314 and 318 of the system 300, the web content 410 and web content 416 typically comprise text and graphics that can be downloaded into the user's browser 304. Unlike the system 300, however, generic access instructions need not be downloaded into the browser 304 in that the browser does not comprise its own imaging extension. Such an arrangement is advantageous where the client device 302 has limited storage capacity (e.g., for PDAs, mobile telephones). Instead, as identified above, the services 408 and 414 include their own imaging extensions 412 and 418 that can be used to access the user's personal imaging repository 320. By way of example, the content 410 and 416 comprise server-side code including one or more of PHP script, Java™ Servlets, Java™ server pages (JSPs), active server pages (ASPs), etc.

Each of the imaging extensions 412 and 418 typically has configurations that are similar to that of the imaging extension 310. Therefore, the imaging extensions 412 and 418 can comprise one or more APIs that, when executed, access to the user's personal imaging repository 320. Again, the APIs can comprise sets of methods for establishing a destination for redirecting the browser 304 based on some form of received redirection initiation. The APIs can implement, for instance, a URL, pointer, socket, or other backroom detail to facilitate the redirection.

The manner in which the personal imaging repository 320 is accessed by the services in the system 400 will now be discussed with reference to an example scenario. In this example, the user browses to the imaging service 408 using the web browser 304 of the client device 302. Upon reaching the service 408, web content 410 is executed to generate web pages that are downloaded to the web browser 304 (as content 306). Once this occurs, the browser 304 is redirected by the content 306 to the authentication service 404 that resides on the web server 402. Typically, this is accomplished by the web content 410 by generating a hypertext transfer protocol (HTTP) redirect that, when downloaded to the browser 304, causes the browser to redirect to an address (e.g., URL) identified in the header entry. Web content is then downloaded to the web browser 304 and the user is provided with an opportunity to complete an authentication procedure that identifies both the user's identity and the location of the user's personal imaging repository 320. The authentication procedure can, for example, comprise entry of authentication information, such as a user name and password, that has been registered with the authentication service 404, for example, in a previous session. This information can be entered in a web page generated by the server 402. In an alternative arrangement, the authentication procedure can comprise the reading of a user identification card, which includes storage media (e.g., magnetic strip) that contains the user's authentication information. Persons having ordinary skill in the art will recognize that many other authentication alternatives exist.

Once the authentication procedure is successfully completed by the user, the browser 304 is again redirected, this time back to the imaging service 408. The redirection address (e.g., URL) used to revisit the imaging service 408 contains information that identifies the user and information identifying the user's personal imaging repository 320 (e.g., with a further URL). To avoid continual redirection back and forth, a "cookie" can be stored on the client device 302 that permits the authentication service 404 to validate the user's identity without requiring a further log in. Once this information is possessed by the imaging service 408, the service can, when appropriate, make calls to its imaging extension 412 (e.g., API calls) to command the imaging extension to access the user profile store 324 of the personal imaging repository 320. Through this access, the imaging service 408 can be used by the user to, for instance, select or identify imaging data to be stored as graphics in the default graphic store 336.

When the printing service 414 is accessed, for example through redirection from the imaging service 408 when a "print" button is selected various content is downloaded to the web browser 306. The printing service 414 can then access the default graphic store 336 and default composition store 346 such that the graphics to be printed can be accessed and their arrangement on the document obtained.

Figure 5:
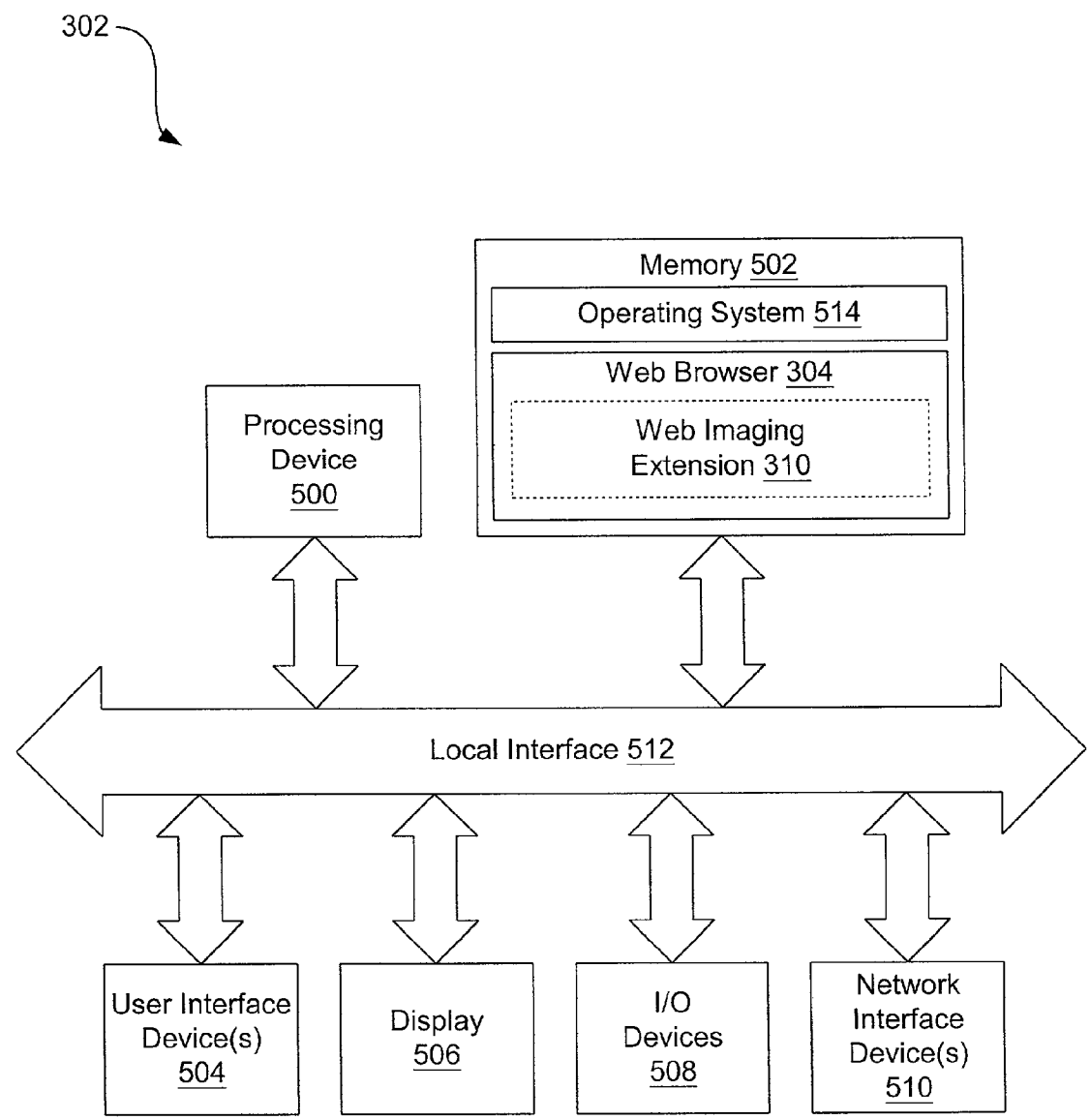
FIG. 5 is a schematic of an imaging client device shown in FIGS. 3 and 4.

FIG. 5 is a schematic view illustrating an example architecture for the imaging client device 302 identified in FIGS. 3 and 4. As identified above, the client device 302 can be any one of a wide variety of conventional wired and/or wireless computing devices, such as desktop computers, portable computers, dedicated server computers, multi-processor computing devices, cellular telephones, PDAs, handheld or pen-based computers, gaming consoles, and so forth. Irrespective its type, the client device 302 typically comprises a processing device 500, memory 502, one or more user interface devices 504, a display 506, one or more input/output (I/O) devices 508, and one or more networking devices 510, each of which is connected to a local interface 512.

The processing device 500 can include any custom made or commercially available processor, a central processing unit (CPU) or an auxiliary processor among several processors associated with the client device 302, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the client device 302. The memory 502 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 504 comprise those components with which the user can interact with the client device 302. For example, where the client device 302 comprises a personal computer (PC), these components can comprise a keyboard and mouse. Where the client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid crystal display (LCD) for a handheld device.

With further reference to FIG. 5, the one or more I/O devices 508 are adapted to facilitate connection of the client device 302 to another device and may therefore include one or more serial, parallel, small computer system interface (SCSI), universal serial bus (USB), IEEE 1394 (e.g., Firewire™), and/or personal area network (PAN) components. The network interface devices 510 comprise the various components used to transmit and/or receive data over a network (e.g., network 204 in FIG. 2). By way of example, the network interface devices 510 include a device that can communicate both inputs and outputs, for instance, a modulator/demodulator (e.g., modem), wireless (e.g., radio frequency (RF)) transceiver, a telephonic interface, a bridge, a router, network card, etc.

The memory 502 normally at least comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources. Where the web browser 304 is configured as indicated in FIG. 3, the browser can comprise an imaging extension 310. However, it will be understood that where the system is arranged as indicated in FIG. 4, the imaging extension 310 need not be provided in the browser 304.

The architecture of the various servers shown in FIGS. 3 and 4 are typically similar to that described above with reference to FIG. 5. Therefore, separate FIGS. are not provided for these servers. Regardless, however, persons having ordinary skill in the art will recognize the various different architectures that could be used for the construction of the servers.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 6:
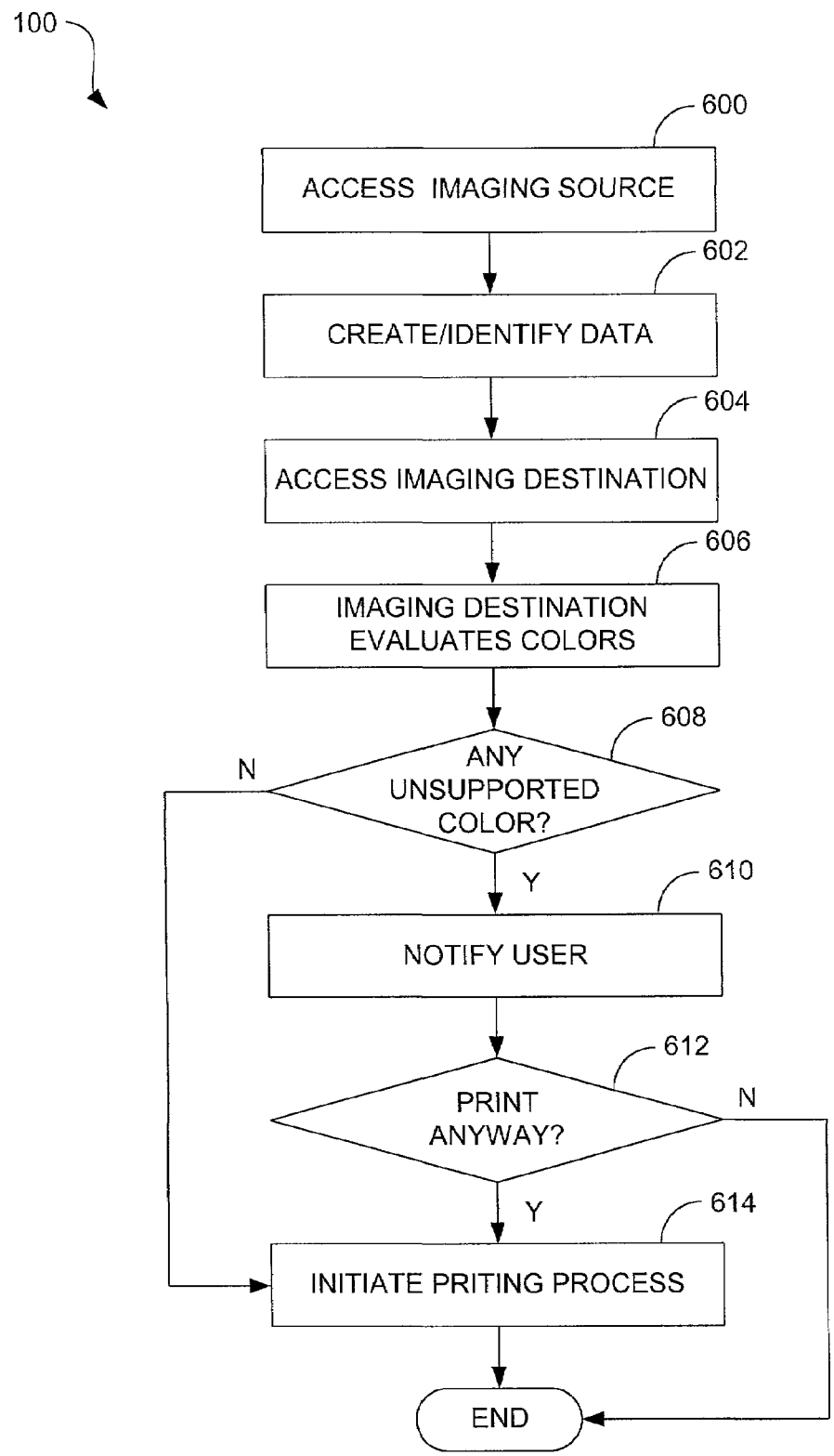
FIG. 6 is a flow diagram that provides an overview of the manner in which the inventive system can be used to notify a user as to the inadequacy of a printing device's color gamut.

FIG. 6 provides an overview of an example of the manner in which the inventive system is used to notify users. As indicated in block 600, an imaging source 102 is first accessed by the user. Once the source is accessed, the user creates or identifies data that are to be used to generate one or more hard copy documents, as indicated in block 602. By way example, data can be created/identified with a suitable user application, such as a drawing or word processing application. Where the data are created by the user, the user may further select the arrangement (i.e., composition) of the data. Notably, the data may include text as well as one or more graphics.

At this point, an imaging destination 104 can be accessed, as indicated in block 604. By way of example, the imaging destination 104 comprises a network-based (e.g., web-based) printing service that includes one or more remote printing devices and/or that facilitates printing on one or more printing devices proximate to the user. Alternatively, the imaging destination 104 can comprise a separate service that is capable of evaluating the colors of the imaging data to determine whether the printing device that will be used is capable of reproducing the colors with exactitude. Once the imaging destination 104 is accessed, the imaging destination evaluates the colors represented by the imaging data (e.g., contained within a document), as indicated in block 606. This evaluation can be conducted in several different ways, as is explained below. By way of example, however, the evaluation is made with reference to information contained within or associated with the imaging data that defines the various colors represented by the data.

With reference to decision element 608, once the evaluation has been conducted, it can then be determined whether one or more colors are not supported by the printing device, i.e., one or more colors of the imaging data are not contained within the color gamut of the printing device. If not, that is all colors contained within the imaging data are supported by the printing device, flow continues down to block 614 described below. If one or more colors is not supported, however, the user is notified as to this condition, as indicated in block 610. Next, it can be determined whether the user wishes to print anyway, as indicated in decision element 612. By way of example, this determination is made by prompting the user to choose to continue or cancel the printing process. If the user wishes to cancel the printing process, flow is terminated. If, on the other hand the user wishes to continue the printing process, i.e., print despite the inadequacy of the printing device's color gamut, flow continues to block 614 at which the printing process is initiated.

Figure 7:
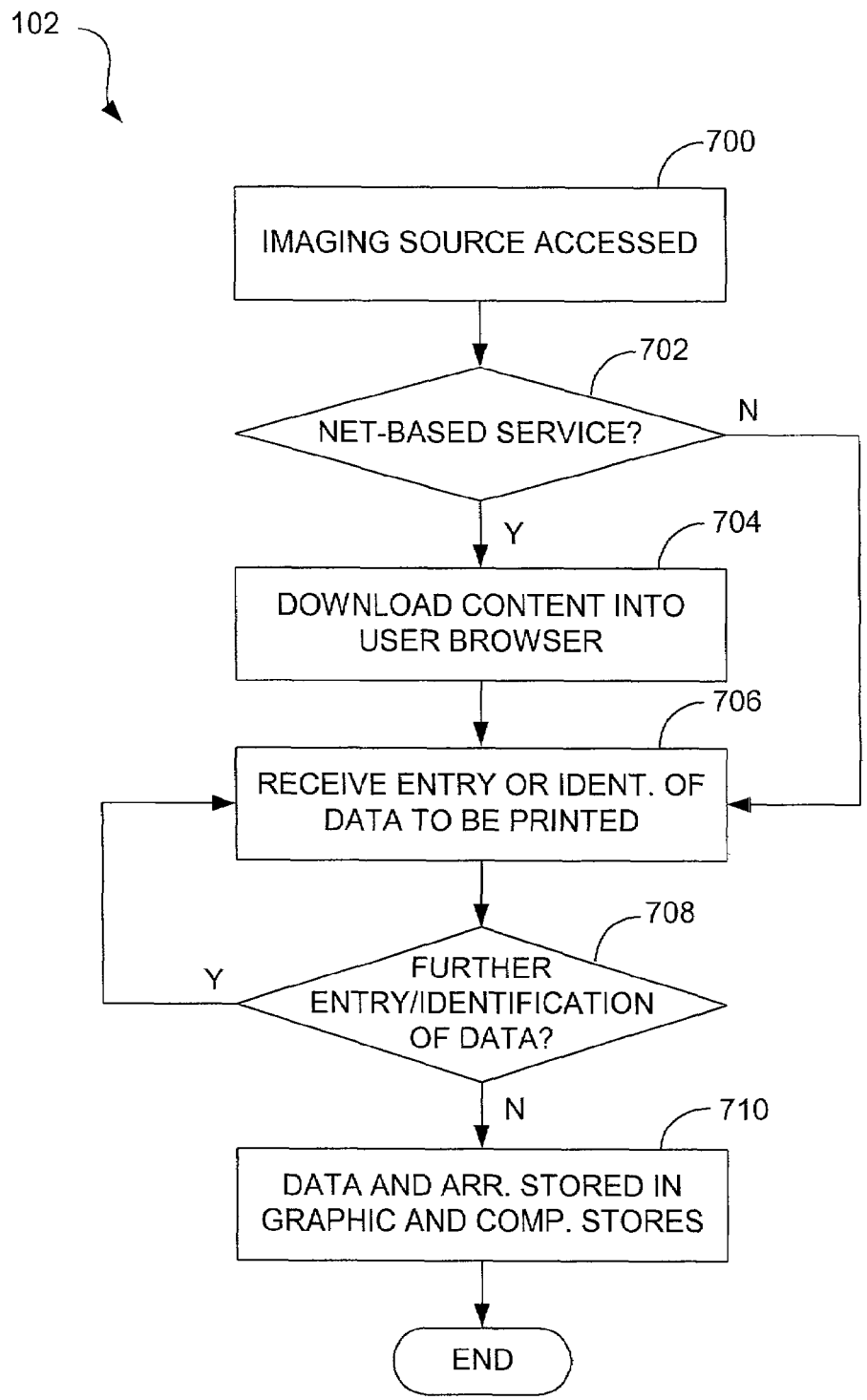
FIG. 7 is a flow diagram of an example of using an imaging source to create and/or identify data to be printed.

Referring now to FIG. 7, an example of use of an imaging source 102 to create and/or identify data to be printed is provided. The imaging source 102 can have various different arrangements. By way of example, the imaging source 102 can simply comprise a local application (e.g., drawing or word processing application) that executes on the client device 302. In another example, the imaging source 102 can comprise a network-based (e.g., web-based) service with which data can be created, identified, and/or arranged by the user. Where the imaging source 102 comprises a network-based service, the user may access the source with a browser 304. In such a scenario, the service typically comprises a web site that is accessed via the Internet.

Irrespective of its configuration, the imaging source 102 is first accessed by the user, as indicated in block 700. The operation from this point forward may, however, depend upon whether the imaging source 102 is a local application or a network-based service. Referring to block 702, if the imaging source 102 is not a network-based service, flow continues down to block 706 described below. If, on the other hand, the imaging source 102 is a network-based service, flow continues to block 704 at which the imaging source 102 downloads content 306 into the user browser. As noted above, this content 306 normally includes various text and/or graphics that are displayed to the user to facilitate interfacing between the user and the service. As described above with reference to FIG. 3, this content 306 can, optionally, include generic access instructions 308 that call on methods of an imaging extension 310 of the browser 304 to perform various web imaging operations.

After the imaging source 102 has been accessed, the source can receive entry or identification of data (i.e., graphics), as indicated in block 706. For example, the imaging source 102 can receive data manually entered by the user via the user interface devices 504 of the client device 302. Alternatively, the user can identify the location of data (e.g., a formerly created document) that resides in memory 502 of the client device 302 or in a network-accessible location remote from the device memory. Once the data have been received and/or identified, it can be determined whether further data are to be entered and/or identified, as indicated in decision element 708. If further data are to be entered and/or identified, flow returns to 706 at which these data are received. If no further data are to be entered and/or identified, however, flow continues on to block 710 at which the received data, as well as the arrangement (i.e., composition) of the data, are stored within the personal imaging repository 320. More specifically, the data can be stored within the graphic store 336 and the arrangement of the data can be stored within the composition store 346. Although the data and arrangement (i.e., imaging data) have been described as being stored in separate "stores," persons having ordinary skill in the art will appreciate that the data and their arrangement could be stored within a single "store."

Where the imaging source 102 is a network-based service, storage of the imaging data can be facilitated through use of the imaging extension 310 stored in the user browser 304 and/or an imaging extension 412 stored on web server 408. In the former case, the content 306 downloaded to the browser 304 makes a call (e.g., API call) to the imaging extension 310 to, in turn, cause a call to be made to the user profile store 324 that contains the user profile 326. Through this call, the default graphic store 336 can be accessed and various graphics can be stored therein.

In the example system 400 of FIG. 4, storage of the imaging data is accomplished through use of the imaging extension 412. In particular, when the imaging source 102 was first accessed, the user's browser 304 can have been redirected by the content 306 downloaded into the browser to an authentication service and the user provided with an opportunity to complete an authentication procedure that identifies both the user's identity and the location of the user's personal imaging repository 320. Once the authentication procedure has been successfully completed, the browser 304 is again redirected and the user information, or at minimum the location of the user profile 326, is supplied to the print service. With this information, the service can then access the user's personal imaging repository 320 by making a call to the imaging extension 412 to command the imaging extension to make a call to the user profile store 324 of the personal imaging repository 320. It is noted that, although use of an imaging extension is specifically identified, persons having ordinary skill in the art will appreciate that, alternatively, the service can directly call the user profile store 324. In such a case, the service can, for instance, use a collection of stubs that are configured to call various elements of the personal imaging repository 320.

It is to be noted that the graphic store 336 and/or composition store 346 can, in some arrangements, form part of or be supported by the imaging source 102. Accordingly, where the imaging source 102 comprises a local application, the stores 336, 346 may be located within memory 502 of the client device 302. Where the imaging source 102 comprises a network-based service, the stores 336, 346 may be located on one or more servers that are accessible over the network 204.

Optionally, the imaging source 102 can store a scaled-down version of the document, either in addition to or in exception to the original document, which the user has created and/or identified. By way of example, this scaled-down version of the document can comprise bitmaps of the various pages of the document that will ultimately be accessed by an appropriate imaging destination 104 that is capable of printing the document. Such scaled-down versions can typically be generated by imaging sources without difficulty in that many of these sources are capable of generating print previews that comprise a "snapshot" of the document as it would appear if printed in hard copy form. Moreover, many such imaging sources permit scaling of the previews. As will be appreciated from the discussion that follows, storage of a scaled-down version of the document simplifies the color evaluation conducted by imaging destination 104. The imaging source 102 may also be able to provide, using stored information or by on-demand synthesis, information about the colors associated with graphics available through the imaging source. This information is likewise useful in color evaluation. Once the imaging data have been stored, flow for the session with the image source 102 is terminated.

Figure 8A:
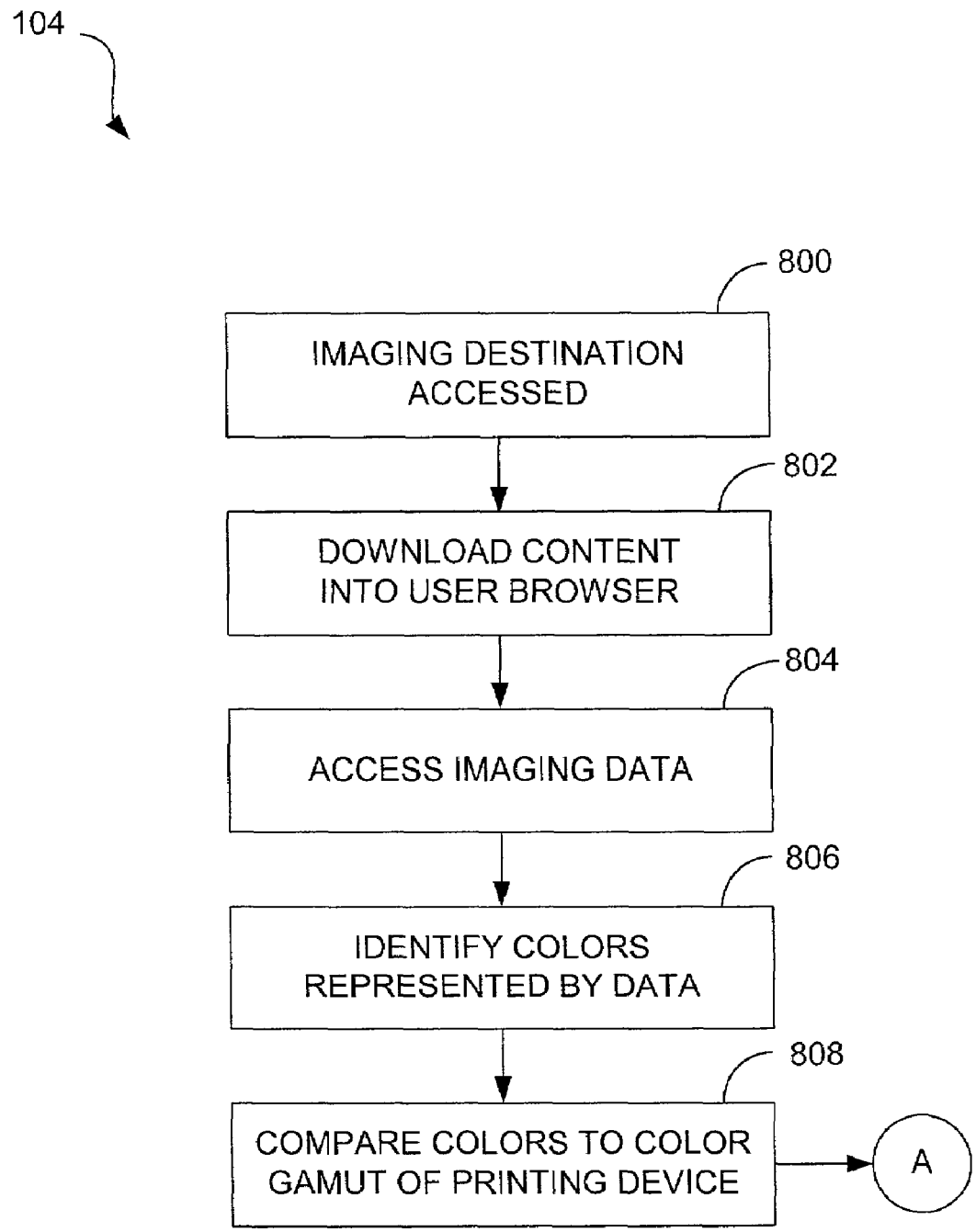
FIGS. 8A and 8B provide a flow diagram illustrating an example of operation of an image destination in providing a notification of color gamut inadequacy.
Figure 8B:
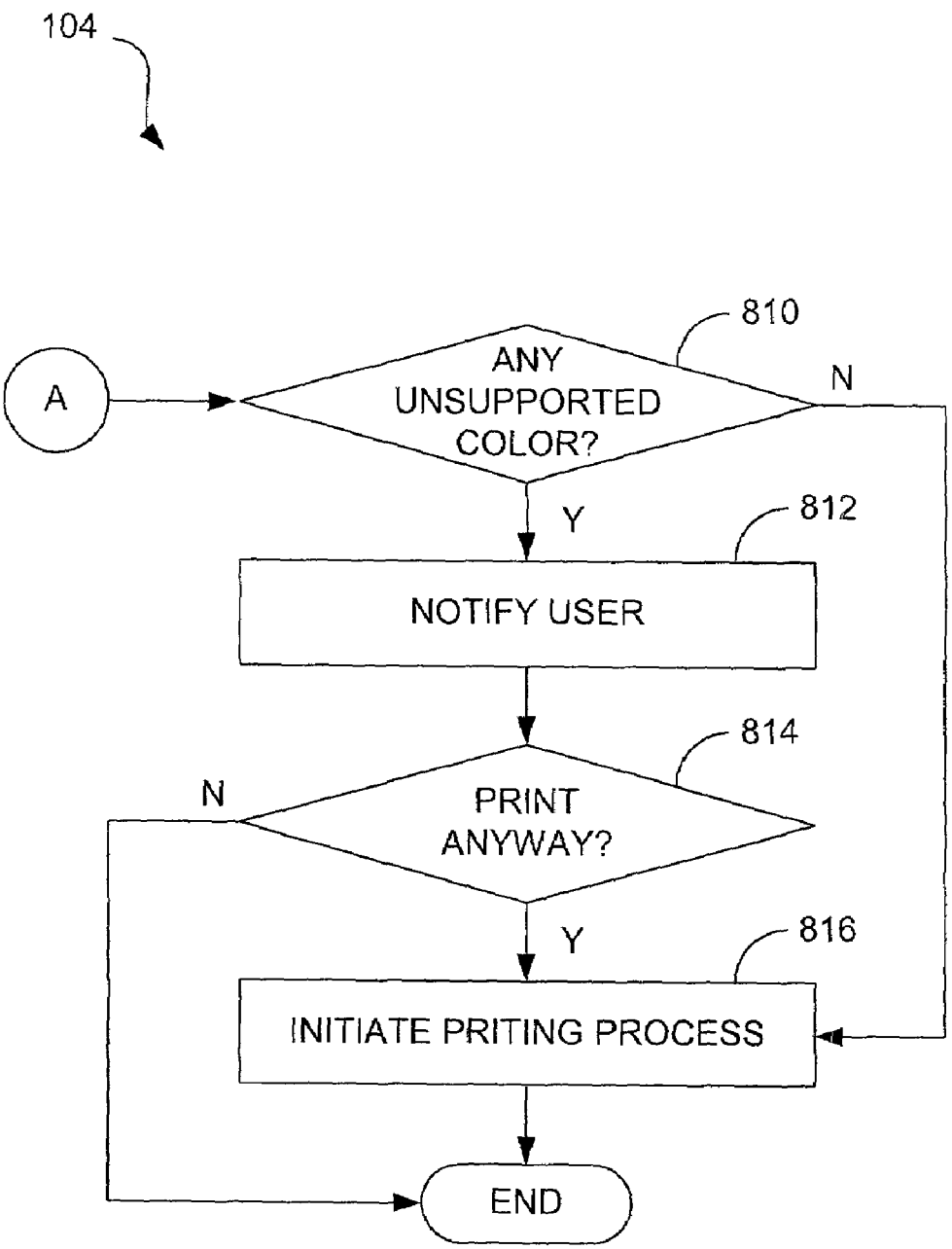

FIGS. 8A and 8B provide an example of operation of an imaging destination 104 in providing notice to a user as to an inadequate color gamut condition. As noted above, the imaging destination 104 can comprise a printing service that is capable of this functionality or a separate evaluation service accessed after the imaging source and a printing service. In any case, however, the imaging destination 104 (i.e., service) typically is closely associated with the printing device that is going to be used to print the imaging data. In particular, imaging destination 104 will have access to information relating to the color capabilities of the printing device. This way, the service will have knowledge of the selected printing device and therefore, will be able to make the determination as to whether the printing device can represent the colors with exactitude.

Beginning with block 800 of FIG. 8A, the imaging destination 104 is first accessed. Typically, this access is achieved by browsing to the imaging destination over a network. This can be accomplished explicitly or implicitly (e.g., by redirection from another service). For purposes of illustration, the imaging destination 104 is assumed to comprise a printing service that is capable of analyzing colors of imaging data (e.g., a document). By way of example, this printing service includes a web site that is accessed via the Internet. Where the imaging source 102 comprises a network-based service, arrival at the imaging destination 104 can have been effected by selecting a "print" button from an imaging source web site.

Once the printing service is accessed, it downloads content 306 into the user's browser 304, as indicated in block 802. This content 306 normally includes various text and/or graphics that are displayed to the user to facilitate interfacing between the user and the service. Where the system is arranged as shown in FIG. 3, the content 306 can also include generic access instructions 308 that call on methods of the imaging extension 310 of the browser 304 so that the user's personal imaging repository 320 can be accessed. Where the system is arranged as shown in FIG. 4, the imaging extension 418 of the imaging destination can be used to access the personal imaging repository 320. In this latter case, the imaging extension 418 knows the location of the personal imaging repository 320 from information provided to the imaging destination with, for example, a redirection address (e.g., URL).

Next, the printing service accesses the imaging data (e.g., document) that are to be printed, as indicated in block 804. Where the imaging source 102 comprises a local application that executes on the client device 302, this access can be facilitated by entry by the user of the location of a document to be printed. Alternatively, where the imaging source 102 comprises a network-based service, the printing service can gain access by automatic reference to the user's personal imaging repository 320 using an imaging extension 310 or 418. Assuming the user had just created and/or identified the document(s) using a network-based service, the imaging data comprises the graphics and default composition that were stored by the network-based service.

By accessing the imaging data in the personal imaging repository 320, the printing service can obtain information about the colors that the data represent. By way of example, the imaging data can include identification of various Pantone™ colors that have been used to create a document which the data represent. In addition or alternatively, the imaging data can include one or more International Color Consortium (ICC) profiles that identify the specific color (from the perspective of a typical human being) of various red, green, blue (RGB) triplets that have been used to create the document. As will be appreciated by persons having ordinary skill in the art, information about the colors can take other forms. The form in which this information is provided is unimportant. More important is the fact that the color information can be obtained by the printing service.

Color information (as in the color information associated with a document or image) can be provided in two ways: "relative" and "absolute." Color is typically supplied as a set values, such as RGB intensities, CMY (the amount of cyan, magenta, and yellow toner to be placed upon print media such as paper), YCC (luminosity, chromaticity 1, and chromaticity 2), among others. It should be noted that it is generally possible to convert from one set of values representing color to another type using a linear transform. Generally, these transforms are invertible.

When color is provided "relatively," the interpretation of the set of values specifying the color is determined by the specific hardware. The actual color perceived by the user (color perception depends on the rods and cones in the human eye) will vary depending on the particular monitor, printer, or other device used to generate the color. Typically, the set of values is linearly transformed into a form appropriate to the particular device and used to modulate the particular type of hardware. For example, in the case of cathode ray tube (CRT) monitor, if color values are supplied as CMY, these values would be linearly converted into RGB and then used to modulate the CRT guns used in typical displays. Because the characteristics of monitors vary from model to model and manufacturer to manufacturer, the actual color perceived by the user would vary depending on the monitor used to view the color.

When color is provided absolutely, the interpretation of the set of values specifying the color is determined absolutely. For example, a particular RGB triplet will indicate a specific human color perception. An RGB triplet representing an absolute color may be interpreted using a color profile, such as that identified by an ICC profile. This profile may be implicit, as is the case which colors interpreted as standard RGB (sRGB). As another example, a particular Pantone™ color will also indicate a specific human color perception. It may not be possible to recreate exactly the same human color perception indicated by the absolute color on the hardware in question (e.g., display or printer) because of the characteristics of that hardware. The range of colors capable of being produced with a given hardware system is referred to as the "gamut" of the system. It is sometimes the case that a particular absolute color does not fall within the gamut of a hardware system and thus the hardware system will be incapable of replicating the intended human color perception. To minimize the impact of out-of-gamut colors, hardware systems will map colors into their gamut. Usually this is acceptable to the user, but under some circumstances this may be unacceptable (such as when printing a company logo).

Instead of accessing the color information from the personal imaging repository 320 in the manners described above, the access of the imaging data can comprise retrieval of a scaled-down version (e.g., bitmap) of a document to be printed, as mentioned above. Operating in this manner, the printing service can retrieve the data more quickly than if the original document were uploaded to the service in its entirety. Alternatively, color information about the imaging data may be retrieved and evaluated by the imaging destination 104 against the capabilities of the device or color information about the device may be supplied to an appropriate store and evaluated by the store against the colors present in the imaging information.

Once the imaging data have been accessed, the printing service can identify the colors represented by the imaging data, as indicated in block 806. After this identification has been made, the printing service can compare the identified colors with those of the color gamut of the printing device, as indicated in block 808. As noted above, this comparison is facilitated by the close association between the service and the printing device. Indeed, in some embodiments, the printing service can be hosted by the printing device so as to have the most accurate and current knowledge about the printing device's capabilities. In such a scenario, the information about the color gamut may be contained within a database stored in the printing device.

Referring now to FIG. 8B and decision element 810, it can then be determined whether one or more colors are not supported by the printing device, i.e., one or more colors of the imaging data are not contained within the color gamut of the printing device. If all the colors are supported by the printing device, flow continues down to block 816 described below. If one or more colors are not supported, however, the user is notified as to this condition, as indicated in block 812. By way of example, the user can be notified with an interface (e.g., graphical user interface (GUI)) in the form of a printing warning that is presented to the user with the browser 304.

Figure 9:
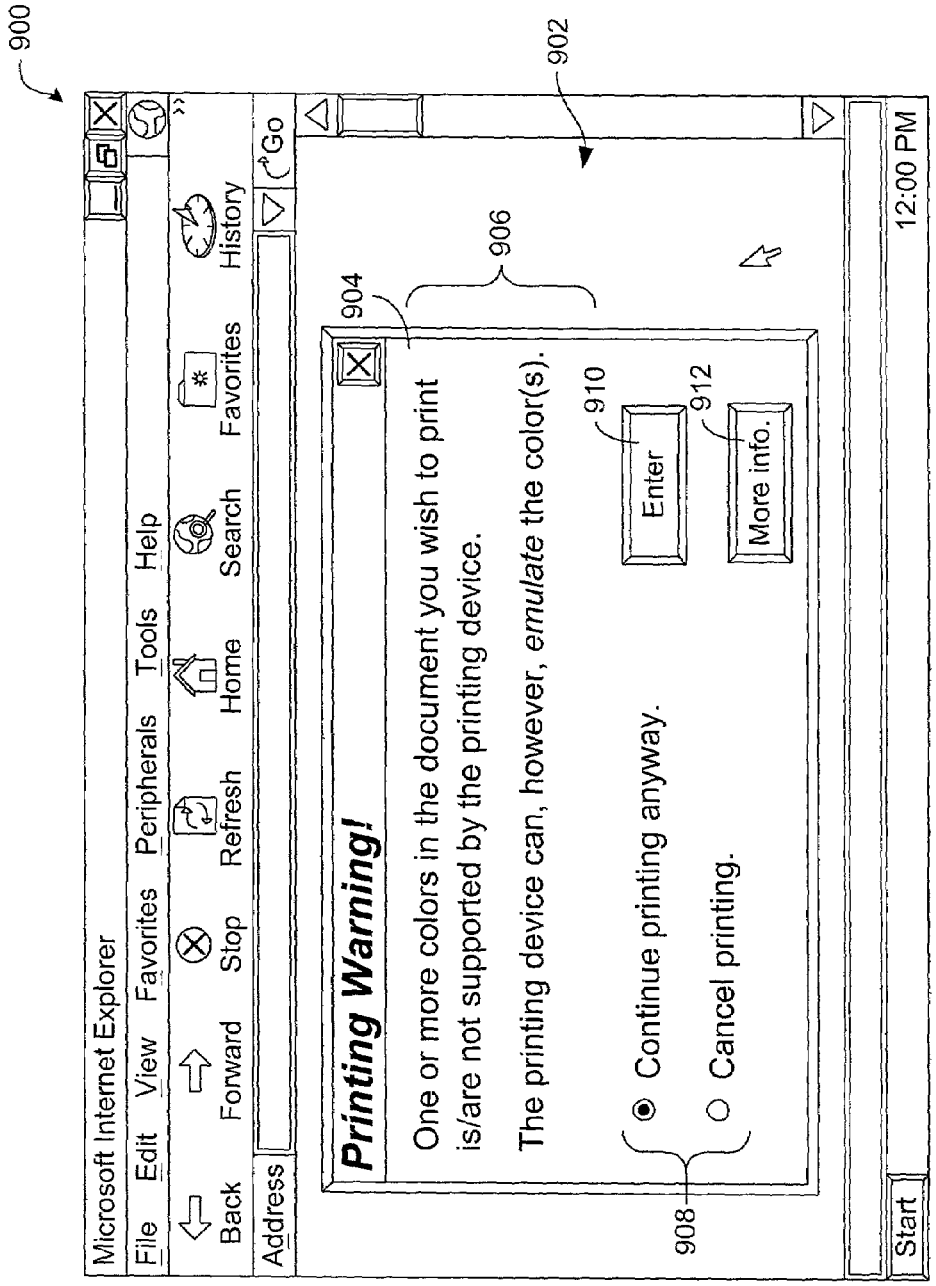
FIG. 9 is an example notification that can be used in the example of FIGS. 8A and 8B.

FIG. 9 is a schematic representation of an example browser interface 900 in which an example web page 902 is shown. Although the browser interface 900 is shown as a Windows-based browser interface, it will be appreciated that substantially any browser interface could be used. Therefore, the interface may not appear as indicated in FIG. 9, particularly where the client device 302 comprises a handheld computing device such as a PDA or mobile telephone. As depicted in FIG. 9, a printing warning 904, for instance in the form of a dialogue box, can appear that includes a warning message 906, which identifies the inadequacy of the printing device's color gamut. In addition, the warning 904 can include options 908 to continue printing or cancel printing. By way of example, these options can be chosen by selecting an "enter" button 910. Optionally, the user can obtain more information about the potential problem by selecting a "more info." button 912 that, when selected, provides a further dialogue box to the user explaining the inadequacy of the color gamut and the potential effect on the printed document. Furthermore, this button can, optionally, provide the user with a link to a service that can be used to adjust the color or colors as desired.

Returning to FIG. 8B and decision element 814, it can then be determined whether the user wishes to continue the printing process. If the user does not wish to continue, flow is terminated. If, on the other hand the user does wish to continue the printing process despite the color gamut inadequacy, flow continues to block 816 at which the printing process is initiated, for instance by retrieving the imaging data for the purpose of printing it.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for notifying a user as to an inadequate color gamut, comprising:
   responsive to a print command, accessing imaging data to be printed;
   identifying colors represented by the imaging data from information contained within the imaging data;
   comparing the identified colors with a color gamut of a printing device that is to print the imaging data; and
   notifying the user if one or more of the identified colors is not included in the color gamut of the printing device;
   wherein the color identification occurs independent of consideration of monitor characteristics.

2. The method of claim 1, wherein accessing imaging data for the purpose of identifying colors comprises the printer retrieving the imaging data.

3. The method of claim 1, wherein accessing imaging data comprises accessing imaging data through use of an imaging extension comprising one or more application programming instructions.

4. The method of claim 3, wherein the imaging extension comprises part of a user browser and is called by generic access instructions downloaded to the user browser from a web-based printing service.

5. The method of claim 3, wherein the imaging extension comprises part of a web-based printing service.

6. The method of claim 1, wherein identifying colors comprises identifying a Pantone color identification included in the accessed imaging data.

7. The method of claim 1, wherein identifying colors comprises identifying a set of intensity values included in the accessed imaging data that represent an absolute color defined by a color profile.

8. The method of claim 7, wherein the set of intensity values comprises at least one of RGB, CMY, and YCC.

9. The method of claim 7, wherein the color profile comprises an ICC profile.

10. The method of claim 1, wherein notifying the user comprises presenting a printing warning to the user that includes a message that explicitly explains that the printing device does not support a desired color.

11. A system for notifying a user as to an inadequate color gamut, comprising:
    means responsive to a print command for accessing imaging data to be printed;
    means for identifying colors represented by the imaging data from information contained within the imaging data;
    means for comparing the identified colors with a color gamut of a printing device that is to print the imaging data; and
    means for notifying the user if one or more of the identified colors is not included in the color gamut of the printing device;
    wherein the means for identifying identifies the colors independent of characteristics of a monitor used to view the colors.

12. The system of claim 11, wherein the means for accessing imaging data comprises an imaging extension comprising one or more application programming instructions.

13. The system of claim 12, wherein the imaging extension comprises part of a user browser and is called by generic access instructions downloaded to the user browser from a web-based printing service.

14. The system of claim 12, wherein the imaging extension comprises part of a web-based printing service.

15. The system of claim 11, wherein the means for identifying colors comprise means for identifying Pantone color information included in the imaging data.

16. The system of claim 11, wherein the means for identifying colors comprise means for identifying a set of intensity values included in the imaging data that represent an absolute color defined by a color profile.

17. The system of claim 16, wherein the set of intensity values comprises at least one of RGB, CMY, and YCC.

18. The system of claim 16, wherein the color profile comprises an ICC profile.

19. A computer-readable memory that stores a network-based service that is configured to notify a user as to an inadequate color gamut condition, the service comprising:
    logic configured to, responsive to a print command, access imaging data to be printed;
    logic configured to identify colors represented by the imaging data from information contained within the imaging data;
    logic configured to compare the identified colors with a color gamut of a printing device that is to print the imaging data; and
    logic configured to notify the user if one or more of the identified colors is not included in the color gamut of the printing device;
    wherein the logic configured to identify identifies the colors independent of characteristics of a monitor used to view the colors.

20. The computer-readable memory of claim 19, wherein the logic configured to access imaging data comprises an imaging extension comprising one or more application programming instructions.

21. The computer-readable memory of claim 20, wherein the imaging extension comprises part of a user browser and is called by generic access instructions downloaded to the user browser from a web-based printing service.

22. The computer-readable memory of claim 20, wherein the imaging extension comprises part of the web-based printing service.

23. A network-accessible printer, comprising:
a processing device; and
memory including a network-based printing service comprising logic configured to access imaging data to be printed, logic configured to identify colors represented by the imaging data from information contained within the imaging data, logic configured to compare the identified colors with a color gamut of the printer, and logic configured to notify the user if one or more of the identified colors is not included in the color gamut of the printer, wherein the logic configured to identify identifies the colors independent of characteristics of a monitor used to view the colors.

24. The printer of claim 23, wherein the logic configured to access imaging data comprises an imaging extension comprising one or more application programming instructions.

25. The printer of claim 24, wherein the imaging extension comprises part of a network-based service hosted by the printer.

26. The computer-readable memory of claim 19, wherein the service is hosted by a network-accessible printer.

27. A method performed by a printing device, the method comprising:
the printing device, responsive to a communication received from a user computing device, downloading content to a network browser of the user computing device;
the printing device accessing via a network imaging data to be printed by the printing device;
the printing device identifying colors represented by the imaging data from information contained within the imaging data itself;
the printing device determining whether a color gamut of the printing device supports all of the identified colors; and
the printing device notifying a user if one or more of the identified colors is not included in the printing device color gamut;
wherein the color identification occurs independent of consideration of monitor characteristics.

28. The method of claim 27, wherein accessing imaging data comprises the printer downloading generic access instructions to the network browser to cause an imaging extension of the network browser to access the imaging data.

29. The method of claim 27, wherein accessing imaging data comprises accessing the imaging data with application programming instructions of the printing device.

30. The method of claim 27, wherein identifying colors comprises identifying a Pantone color identification contained within the imaging data.

31. The method of claim 27, wherein identifying colors comprises identifying a color profile contained within the imaging data.

32. The method of claim 31, wherein the color profile comprises an ICC profile.

* * * * *

UNITED STATES PATENT AND TRADEMARK OFFICE
CERTIFICATE OF CORRECTION

| | |
|---|---|
| PATENT NO. | : 7,420,704 B2 |
| APPLICATION NO. | : 10/039105 |
| DATED | : September 2, 2008 |
| INVENTOR(S) | : Shell Sterling Simpson et al. |

It is certified that error appears in the above-identified patent and that said Letters Patent is hereby corrected as shown below:

Title Pg, Item (73), in "Assignee", delete "L.L.P." and insert -- L.P. --, therefor.

Signed and Sealed this

Fourth Day of August, 2009

JOHN DOLL
*Acting Director of the United States Patent and Trademark Office*